United States Patent
Michino

(10) Patent No.: US 9,509,359 B2
(45) Date of Patent: Nov. 29, 2016

(54) MOBILE TERMINAL DEVICE

(71) Applicant: NEC CASIO Mobile Communications, Ltd, Kawasaki-shi, Kanagawa (JP)

(72) Inventor: Ryota Michino, Kawasaki (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/441,877

(22) PCT Filed: Jun. 13, 2013

(86) PCT No.: PCT/JP2013/003705
§ 371 (c)(1),
(2) Date: May 11, 2015

(87) PCT Pub. No.: WO2014/076852
PCT Pub. Date: May 22, 2014

(65) Prior Publication Data
US 2015/0295614 A1 Oct. 15, 2015

(30) Foreign Application Priority Data
Nov. 19, 2012 (JP) .................. 2012-253433

(51) Int. Cl.
*H04M 1/00* (2006.01)
*H04B 1/3888* (2015.01)
*G06F 1/16* (2006.01)
*H04M 1/02* (2006.01)
(Continued)

(52) U.S. Cl.
CPC ....... *H04B 1/3888* (2013.01); *G02F 1/133308* (2013.01); *G06F 1/1626* (2013.01); *G06F 1/1637* (2013.01); *G06F 1/1656* (2013.01); *H04M 1/0202* (2013.01); *H04M 1/0266* (2013.01); *H04M 1/185* (2013.01)

(58) Field of Classification Search
CPC .. H04M 1/02; H04M 1/0202; H04M 1/0266; G06F 1/1637; G06F 1/1656; H04B 1/3888
USPC .......................................... 455/575.1–575.8
See application file for complete search history.

(56) References Cited

U.S. PATENT DOCUMENTS

2006/0133018 A1   6/2006   Okuda
2010/0203924 A1   8/2010   Hirota
(Continued)

FOREIGN PATENT DOCUMENTS

CN   101536063 A   9/2009
CN   102654655 A   9/2012
(Continued)

OTHER PUBLICATIONS

International Search Report for PCT Application No. PCT/JP2013/003705, mailed on Jul. 16, 2013.
(Continued)

*Primary Examiner* — Charles Shedrick

(57) ABSTRACT

A mobile terminal device (1) according to the present invention includes a housing (11) and a display panel (14). The housing (11) includes a housing body (111) and side walls (112a) provided around the housing body (111). The display panel (14) is provided on the side walls (112a, 112b). The side walls (112a, 112b) are made of sheet metal. An end portion of the sheet metal that faces the display panel (14) is bonded to the display panel(14). Thereby, a mobile terminal device that allows a reduction in frame width while maintaining the strength can be provided.

7 Claims, 9 Drawing Sheets

(51) Int. Cl.
   *H04M 1/18* (2006.01)
   *G02F 1/1333* (2006.01)

(56) References Cited

U.S. PATENT DOCUMENTS

| | | |
|---|---|---|
| 2011/0164372 A1 | 7/2011 | McClure et al. |
| 2011/0287812 A1 | 11/2011 | Joo |
| 2014/0009877 A1 | 1/2014 | Okamoto et al. |

FOREIGN PATENT DOCUMENTS

| | | |
|---|---|---|
| EP | 2388980 A2 | 11/2011 |
| JP | 2008078838 A | 4/2008 |
| JP | 2009208407 A | 9/2009 |
| JP | 2010109760 A | 5/2010 |
| JP | 2010258818 A | 11/2010 |
| JP | 2011171924 A | 9/2011 |
| JP | 2011250205 A | 12/2011 |
| JP | 2012074906 A | 4/2012 |
| JP | 2012156768 A | 8/2012 |
| WO | 2012/086506 | 6/2012 |

OTHER PUBLICATIONS

Extended European Search Report for EP Application No. EP13855529.7 dated Jun. 1, 2016.
Chinese Office Action for CN Application No. 201380060119.1 mailed on Sep. 12, 2016 with English Translation.

MOBILE TERMINAL DEVICE

This application is a National Stage Entry of PCT/JP2013/003705 filed on Jun. 13, 2013, which claims priority from Japanese Patent Application 2012-253433 filed on Nov. 19, 2012, the contents of all of which are incorporated herein by reference, in their entirety.

TECHNICAL FIELD

The present invention relates to a mobile terminal device.

BACKGROUND ART

Mobile terminal devices such as a cellular phone or smart phone have been widespread in recent years. Smart phones, in particular, are desired to have a larger screen in the display unit. Higher strength is also required of mobile terminal devices. For this reason, insert molding techniques where sheet metal that has high strength is encapsulated in a resin material are used for the housings of mobile terminal devices.

Patent Literature 1, for example, discloses an imaging device that has a rear case, for which an insert molding technique is used. More specifically, the rear case has a molded portion formed by insert molding, where resin material surrounds the peripheral edge of a sheet of metal. A glass plate is bonded to the resin material with an adhesive (see FIG. 7 of Patent Literature 1).

CITATION LIST

Patent Literature

Patent Document 1: Japanese Unexamined Patent Application Publication No. 2011-171924

SUMMARY OF INVENTION

Technical Problem

To bond the resin material to the glass plate, however, the sheet metal needs to be encapsulated in the resin material, as shown in Patent Literature 1, To cover a sheet of metal with resin material by insert molding, the resin material needs a certain thickness. Namely, the width of the side wall of the housing is determined by a necessary thickness of the resin material required for the insert molding, so that it is difficult to further reduce the width of the housing. This leads to the problem that an attempt can hardly be made to reduce the width of the frame of the display unit.

In view of the problem described above, an object of the present invention is to provide a mobile terminal device that allows a reduction in frame width while maintaining the strength.

Solution to Problem

The mobile terminal device according to one aspect of the present invention includes a housing that includes a housing body and side walls provided around the housing body, and a display panel provided on the side walls, wherein at least one of the side walls is made of sheet metal, and an end portion of the sheet metal that faces the display panel is bonded to the display panel.

Advantageous Effects of Invention

The present invention can thus provide a mobile terminal device that allows a reduction in frame width while maintaining the strength.

DESCRIPTION OF EMBODIMENTS

<Embodiment 1>

Embodiments of the present invention will be hereinafter described with reference to the drawings.

Figure 1:
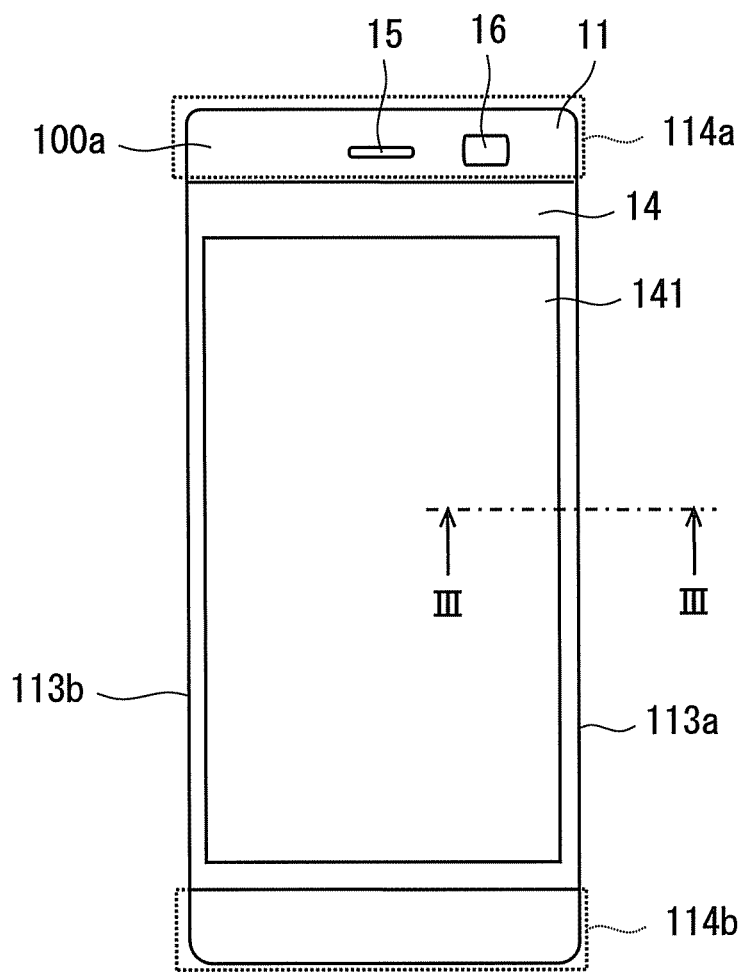
FIG. 1 is a plan view of a mobile terminal device according to Embodiment 1.

FIG. 1 is a front view of a mobile terminal device 1 according to this embodiment.

Figure 2:
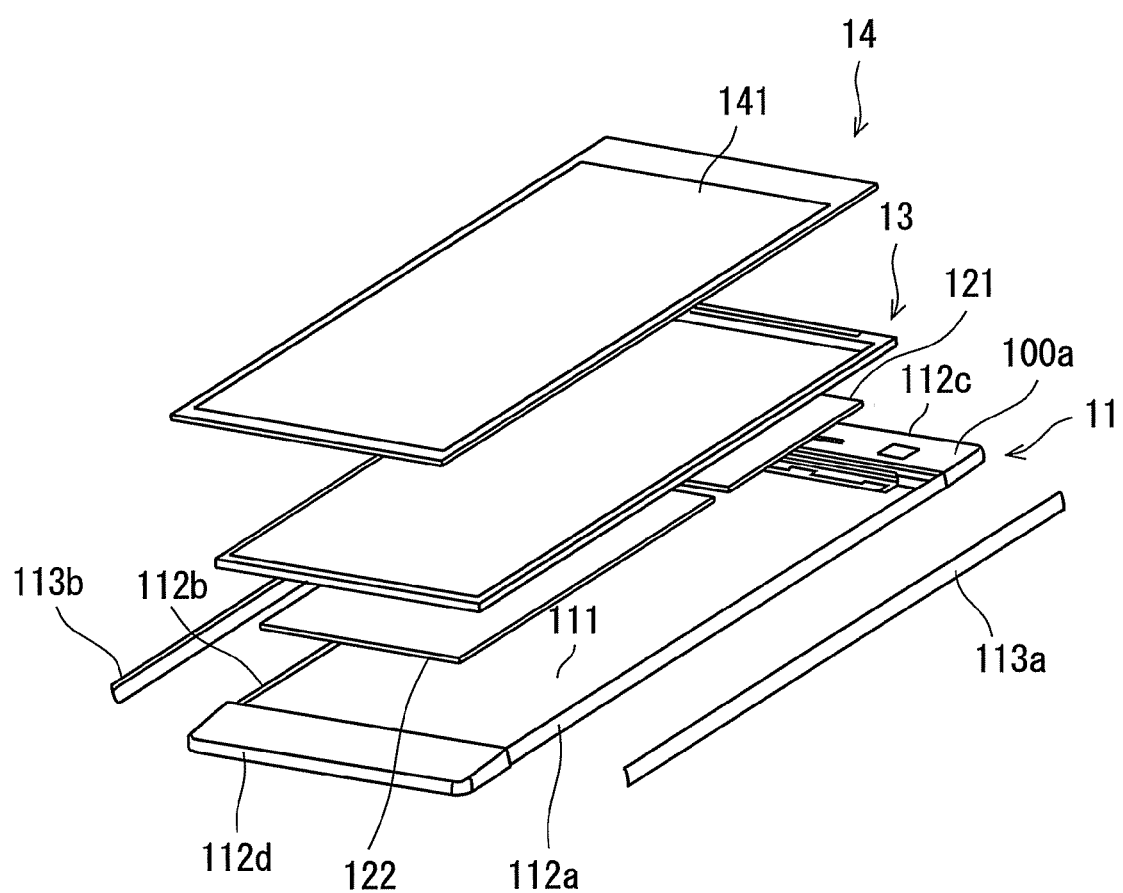
FIG. 2 is an exploded perspective view of the mobile terminal device according to Embodiment 1.

FIG. 2 is an exploded perspective view of the mobile terminal device 1. The mobile terminal device 1 in this embodiment is, for example, a smart phone, tablet-type mobile terminal device, cellular phone, game device, electronic book terminal, and the like.

<General Configuration of Mobile Terminal Device 1>

First, the general configuration of the mobile terminal device 1 will be described with reference to FIG. 1 and FIG. 2. The mobile terminal device 1 according to this embodiment includes a housing 11, a board 121, a battery 122, a liquid crystal unit 13, a display panel 14, a receiver 15, and a proximity sensor 16.

The housing 11 is configured to be able to accommodate the board 121, battery 122, liquid crystal unit 13, and display panel 14. As shown in FIG. 2, the housing 11 includes a generally rectangular housing body 111, side walls 112a to 112d, and resin wall parts 113a and 113b, The side walls 112a to 112d are provided around the housing body 111. The housing 11 accommodates the board 121, battery 122, liquid crystal unit 13, and display panel 14 on the housing body 111. The housing body 111 and side walls 112a and 112b are made of sheet metal.

The side walls 112a and 112b are side walls extending along a longitudinal direction of the housing 11. Namely, the side wall opposite the side wall 112a is the side wall 112b.

The side walls 112c and 112d are side walls extending along a shorter side direction of the housing 11. Namely, the side wall opposite the side wall 112c is the side wall 112d, The side walls 112c and 112d are those located on both sides of the side walls 112a and 112b.

The resin wall part 113a is positioned on an outer face of the side wall 112a. Similarly, the resin wall part 113b is positioned on an outer face of the side wall 112b. The resin wall parts 113a and 113b are components made of resin having lower rigidity than sheet metal. It goes without saying that the resin wall parts 113a and 113b need only be composed mainly of a resin material and may contain other materials.

Both ends in the longitudinal direction of the side wall 112a are formed of a resin material. That is, the central part in the longitudinal direction of the side wall 112a (part corresponding to the display panel 14) is made of sheet metal. Both ends in the longitudinal direction of the side wall 112a are formed of a resin material. The side wall 112b is configured similarly. The housing 11 has antenna areas 114a and 114b formed of a resin material at the ends where the side walls 112c and 112d of the mobile terminal device 1 are. The antenna areas 114a and 114b accommodate antennas (not shown). Namely, no metal material that may affect the communication quality of the antennas is present around the antenna areas 114a and 114b, Therefore, the mobile terminal device 1 can avert a deterioration in the communication quality of the antennas.

The board 121 includes a circuit element (not shown). The circuit element here refers to a circuit that controls an integrated circuit device or the like of a processor, memory, communication module, and the liquid crystal unit 13, for driving the mobile terminal device 1. The battery 122 supplies power to the board 121, liquid crystal unit 13, and others.

The liquid crystal unit 13 is an LCD (Liquid Crystal Display) that displays images as controlled by the board 121. The display panel 14 is located on the main surface 100a of the mobile terminal device 1. The display panel 14 is made of glass or the like, for example. The display panel 14 may be a touchscreen with a touch sensor function. An active area 141 is a region where images are actually displayed by the liquid crystal unit 13.

The mobile terminal device 1 has the receiver 15 and proximity sensor 16 in the antenna area 114a, The receiver 15 is a speaker that outputs the voice of the caller during a phone conversation. The proximity sensor 16 detects an object (such as the user's ear, for example) approaching the mobile terminal device 1 during a phone conversation. The board 121 stops inputs from the touchscreen when the proximity sensor 16 detects an approaching object.

<Detailed Structure of Side Wall 112a>

Figure 3:
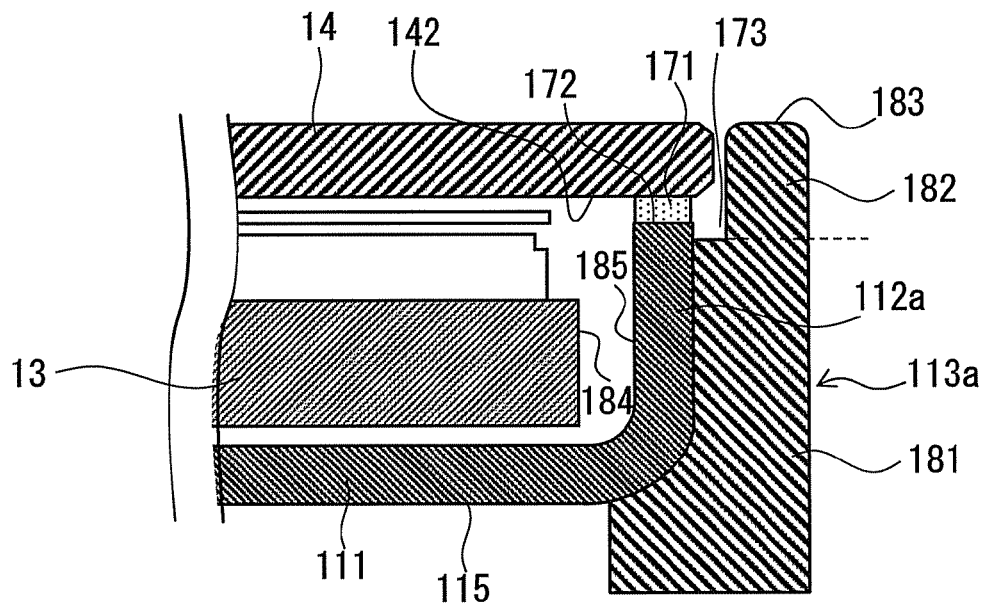
FIG. 3 is a cross-sectional view of a side wall of the mobile terminal device according to Embodiment 1.

Next, the structure of the side wall 112a of the housing 11 will be described in detail with reference to FIG. 3. FIG. 3 is a cross-sectional view along III-III in FIG. 1. As shown in FIG. 3, the liquid crystal unit 13 and display panel 14 are positioned on the housing body 111.

The side wall 112a is made of sheet metal. The resin wall part 113a is provided on the outer side of the side wall 112a, For the bonding of the sheet metal (side wall 112a) with the resin wall part 113a, nano molding technology is used. More specifically, a sheet of metal formed with fine irregularities on the surface and resin material are injection molded, to unite the sheet metal and resin material.

The backside 115 of the housing body 111 (opposite side from the display panel 14) is the backside of the mobile terminal device 1. Namely, the sheet metal (housing body 111) is exposed on the backside 115 of the mobile terminal device 1.

The housing body 111 is connected to the side wall 112a, The side wall 112a stands upright from the housing body 111 toward the display panel 14. Although not shown, the housing body 111 is also connected to the side wall 112b, The side wall 112b stands upright from the housing body 111 toward the display panel 14. Namely, the housing body 111 and side walls 112a and 112b are integrally made of one sheet of metal.

The display panel 14 is bonded to the upper face (bonding surface 172) of the side wall 112a with an adhesive 171. That is, the display panel 14 is bonded to an end face (bonding surface 172) of the sheet metal. More specifically, the end face of the sheet metal is bonded to an end portion of a backside 142 of the display panel 14 (the side facing the housing body 111). This way, the portion of the display panel 14 that protrudes outward beyond the bonded portion can be minimized, which enables a reduction in the frame width.

As mentioned above, the housing body 111 is made of a single sheet of metal only. Therefore, from the viewpoint of keeping the strength, the sheet metal should preferably be thicker than the sheet metal embedded in the resin material. The sheet metal should preferably have a thickness of 0.4 mm or more, for example. The housing 11 can thereby have higher strength. Moreover, an increase in the sheet metal thickness means a wider bonding surface 172, in other words. Therefore, by increasing the sheet metal thickness, not only the strength but also the bonding strength can be increased.

The resin wall part 113a includes a joint portion 181 and an edge portion 182. The joint portion 181 is a portion of the resin wall part 113a that is joined to the side wall 112a. In FIG. 3, the joint portion is the part located below the broken line (backside). The edge portion 182 is located above the joint portion 181 (main surface 100a side). In FIG. 3, the edge portion is the part located above the broken line. The top face 183 of the edge portion 182 is substantially flush with the surface of the display panel 14. In other words, the edge portion 182 covers the end portion of the display panel 14. Therefore, the end portion of the display panel 14 can be protected from external forces.

The height of the joint portion 181 in the thickness direction of the housing 11 is lower than the end face (bonding surface 172) of the side wall 112a, That is, there is a clearance 173 formed between the edge portion 182 and the side wall 112a, Therefore, when the display panel 14 is bonded to the side wall 112a, a surplus of adhesive 171 is pushed into the clearance 173. Accordingly, even if the adhesive 171 is applied to the mobile terminal device 1 in an amount more than necessary, the surplus of adhesive 171 can escape into the clearance 173. In the bonding process carried out by the manufacturer, the adhesive 171 can be applied to the bonding surface 172 in an amount more than necessary. As a result, the display panel 14 is bonded to the side wall 112a with a sufficient bonding strength.

No resin material is present inside the side wall 112a, Namely, an end face 184 of the liquid crystal unit 13 faces the inner face 185 of the side wall 112a, This is because the sheet metal need not be covered such as to be folded in between resin layers since the sheet metal and the resin are united by nano molding technologies in this embodiment. Therefore, the distance between the liquid crystal unit 13 and the side wall 112a can be made small. Not to mention, another member such as a resin part may be interposed between the liquid crystal unit 13 and the side wall 112a.

<Comparison with Comparative Example>

Figure 4:
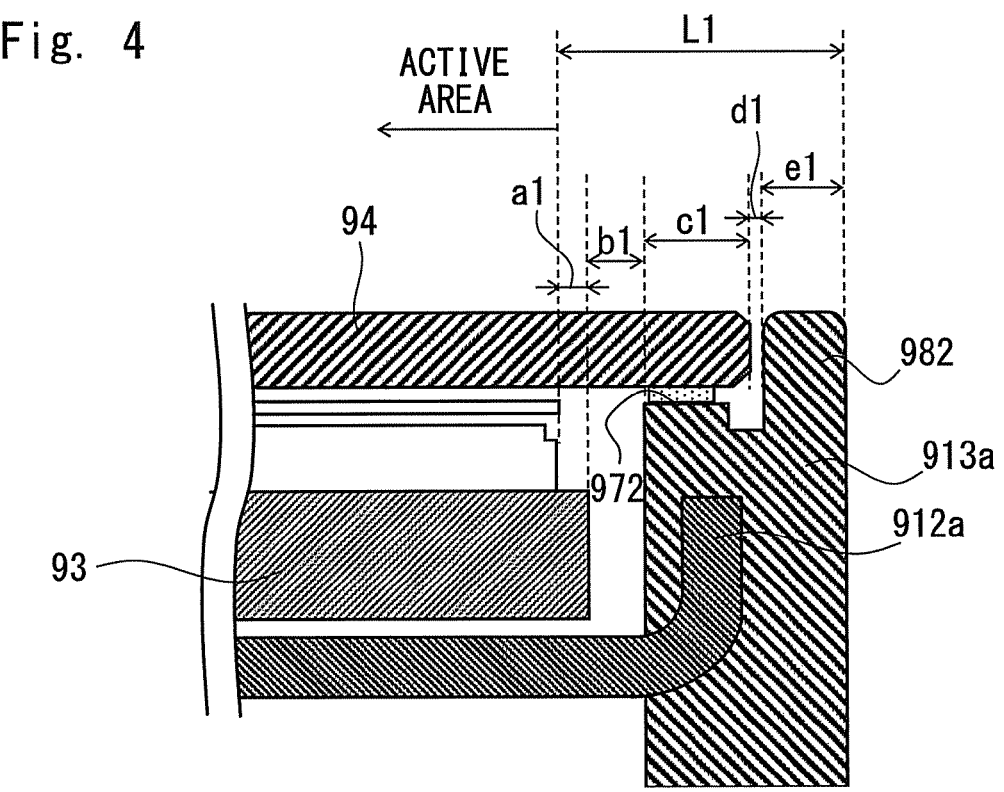
FIG. 4 is a diagram for explaining the frame width of a mobile terminal device according to a comparative example.
Figure 5:
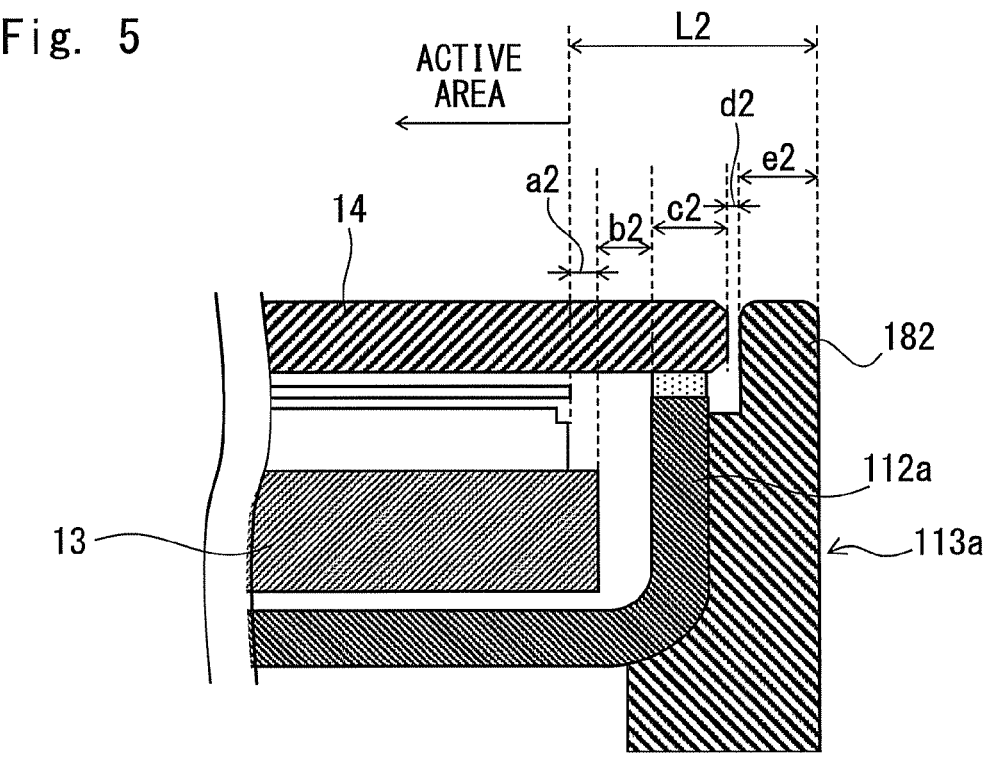
FIG. 5 is a diagram for explaining the frame width of a mobile terminal device according to Embodiment 1.

Now, the difference in the configuration of the frame of the display unit between the mobile terminal device 1 according to this embodiment and a mobile terminal device according to a comparative example will be explained. FIG. 4 is a diagram for explaining the frame width of the mobile terminal device according to the comparative example. FIG. 5 is a diagram for explaining the frame width of the mobile terminal device 1 according to this embodiment. FIG. 4 is a cross-sectional view of the comparative example corresponding to the cross-sectional view of FIG. 3. FIG. 5 is a diagram similar to the cross-sectional view of FIG. 3. The configuration shown in FIG. 4 is a comparative example for explaining the characteristics of the present invention and not a disclosure of known technologies.

First, an explanation will be given about the frame width of the mobile terminal device according to the comparative example. The "frame width" here refers to a distance between an end of an area where images are displayed on the display panel (active area) and a side face of the mobile terminal device. It is the distance L1 in FIG. 4. An end of an active area refers to, for example, an end portion of a polarizing plate of the LCD.

The frame width L1 is the sum of width a1, width b1, width c1, width d1, and width e1. The width a1 is the distance from the end of the active area to an end portion of the liquid crystal unit 93. The width b1 is the distance from the liquid crystal unit 93 to the resin wall part 913a, Namely, the width b1 is that of the clearance between the liquid crystal unit 93 and the resin wall part 913a, In the comparative example, the resin material and sheet metal are united such that the sheet metal is folded inside the resin wall part 913a, Therefore, the side wall 912a (sheet metal) does not face the liquid crystal unit 93, with the resin material (resin wall part 913a) being present between the sheet metal and the liquid crystal unit 93. The width c1 is the distance from the clearance to an end portion of the display panel 94. The width d1 is the distance from the end portion of the display panel 94 to the resin wall part 913a (edge portion 982). Namely, the width d1 is that of the clearance between the display panel 94 and the resin wall part 913a (edge portion 982). The width e1 is the distance from the clearance to the outer face of the mobile terminal device. Namely, the width e1 is the width of the edge portion 982.

An explanation will now be given about the frame width of the mobile terminal device 1 according to this embodiment. The frame width of the mobile terminal device 1 is the distance L2 in FIG. 5.

The frame width L2 is the sum of width a2, width b2, width c2, width d2, and width e2. The width a2 is the distance from the end of the active area to an end portion of the liquid crystal unit 13. The width b2 is the distance from the liquid crystal unit 13 to the side wall 112a, Namely, the width b2 is that of the clearance between the liquid crystal unit 13 and the side wall 112a, The width c2 is the distance from the clearance to an end portion of the display panel 14. The width d2 is the distance from the end portion of the display panel 14 to the resin wall part 113a (edge portion 182). Namely, the width d2 is that of the clearance between the display panel 14 and the resin wall part 113a (edge portion 182). The width e2 is the distance from the clearance to the outer face of the mobile terminal device 1. Namely, the width e2 is the width of the edge portion 182.

Now, the frame width L1 of the mobile terminal device according to the comparative example is compared with the frame width L2 of the mobile terminal device 1 according to this embodiment. In L1 and L2, the following widths are the same: The distance between the end of the active area and the end portion of the liquid crystal unit (width a1, a2), the distance of the clearance between the liquid crystal unit and the side wall (width b1, b2), the width of the clearance between the display panel and the resin wall part (width d1, d2), and the distance between the clearance and the outer face of the mobile terminal device (width e1, e2). On the other hand, the distance between the clearance and the end portion of the display panel (width c1, c2) is different between L1 and L2.

In the mobile terminal device according to the comparative example, the resin material and the display panel 94 are bonded together such that the resin material covers the sheet metal, meaning that resin material is needed for the inner side of the sheet metal, too. Therefore, width c1 includes the width of the resin material located on the inner side of the sheet metal as well as the thickness of the sheet metal. This results in the bonding surface 972 being wider than necessary.

In contrast, in the mobile terminal device 1 according to this embodiment, the end face of the side wall 112a is bonded to the display panel 14, and the side wall 112a is not covered with the resin material. Namely, there is no need to provide resin material on the inner side of the side wall 112a in the mobile terminal device 1. The frame width can therefore be reduced by the width of the resin material on the inner side of the side wall 912a of the comparative example. That is, the mobile terminal device 1 can have a smaller width c2 than width c1. As a result, the mobile terminal device 1 according to this embodiment can have a narrower frame width than the mobile terminal device according to the comparative example shown in FIG. 4.

Furthermore, in the mobile terminal device 1, the end portion of the side wall 112a is bonded to the backside of the display panel 14. That is, the side wall 112a stands upright as far as to directly below the display panel 14. Therefore, the side wall 112a of the mobile terminal device 1 shown in FIG. 5 has a higher ratio of sheet metal than the configuration shown in FIG. 4 where the end portion of the side wall 912a is covered with resin material, so that the side wall can have a higher strength.

As described above, in the mobile terminal device 1 according to this embodiment, the end portion of the side wall 112a (sheet metal) is directly bonded to the display panel 14. That is, the end portion of the side wall 112a (sheet metal) and the display panel 14 are bonded together without any resin material between them. The end portion of the side wall 112a is therefore not covered with resin material. Thus, there is no need to provide resin material on the inner side of the side wall 112a, as a result of which the distance between the liquid crystal unit 13 and the side wall 112a can be made smaller. The housing 11 can maintain its strength because sheet metal is used for the side wall 112a, As a result, the mobile terminal device 1 according to this embodiment can have a narrower frame width while maintaining the strength of the mobile terminal device.

<Variation Example>

Figure 6:
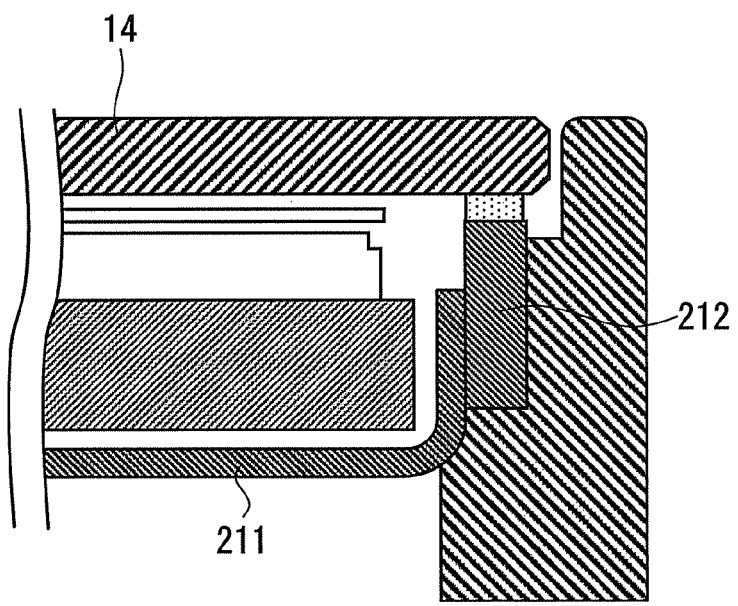
FIG. 6 is a cross-sectional view of a mobile terminal device according to a variation example.

Next, a variation example of this embodiment will be described. A cross-sectional view of a side wall of the mobile terminal device according to the variation example is shown in FIG. 6. The cross-sectional view of FIG. 6 is a diagram that corresponds to the cross-sectional view of FIG. 3. In the housing of the mobile terminal device shown in FIG. 6, the sheet metal of the side wall is thicker than the sheet metal of the housing body. Other parts are configured the same as those of the mobile terminal device 1 shown in FIG. 3 and description thereof will be omitted where appropriate.

The housing of the mobile terminal device according to the variation example includes a backside sheet metal 211 and a side wall sheet metal 212. The backside sheet metal 211 is thinner than the side wall sheet metal 212. The end portion of the backside sheet metal 211 stands upright from the backside toward the display panel 14. The side wall sheet metal 212 is secured to the outer side of the upright portion of the backside sheet metal 211. The backside sheet metal 211 and the side wall sheet metal 212 are united by welding or the like. The backside sheet metal 211 and the side wall sheet metal 212 may not necessarily be separate pieces of sheet metal. A single sheet of metal may be forged, for example, so that the thickness of the backside is thinner than the thickness of the side wall.

With such a configuration, the sheet metal located in the housing body (backside sheet metal 211) can be made thinner. Accordingly, the mobile terminal device can be made thinner. By making the sheet metal located in the side wall (side wall sheet metal 212) thick, the side wall can have a higher strength, as well as there can be provided a sufficient width for the bonding surface.

<Embodiment 2>

Figure 7:
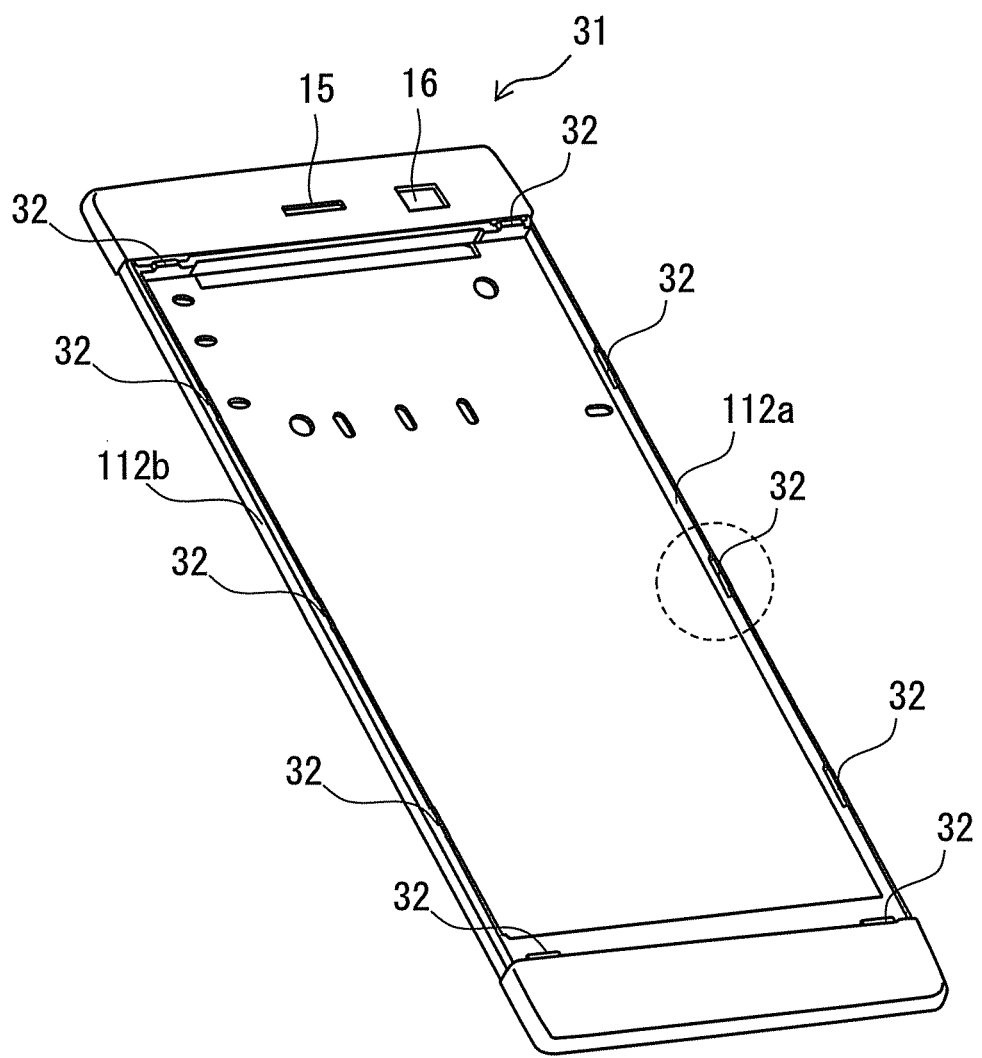
FIG. 7 is an external perspective view of the housing of a mobile terminal device according to Embodiment 2.

Next, Embodiment 2 of the present invention will be described. A perspective view of the housing 31 of a mobile terminal device 2 according to this embodiment is shown in FIG. 7. The housing 31 includes protrusions 32. Protrusions 32 are provided on the side walls 112a and 112b, and at positions corresponding to the four corners of the display panel 14. Other parts are configured the same as those of the housing 11 and description thereof will be omitted where appropriate.

Figure 8:
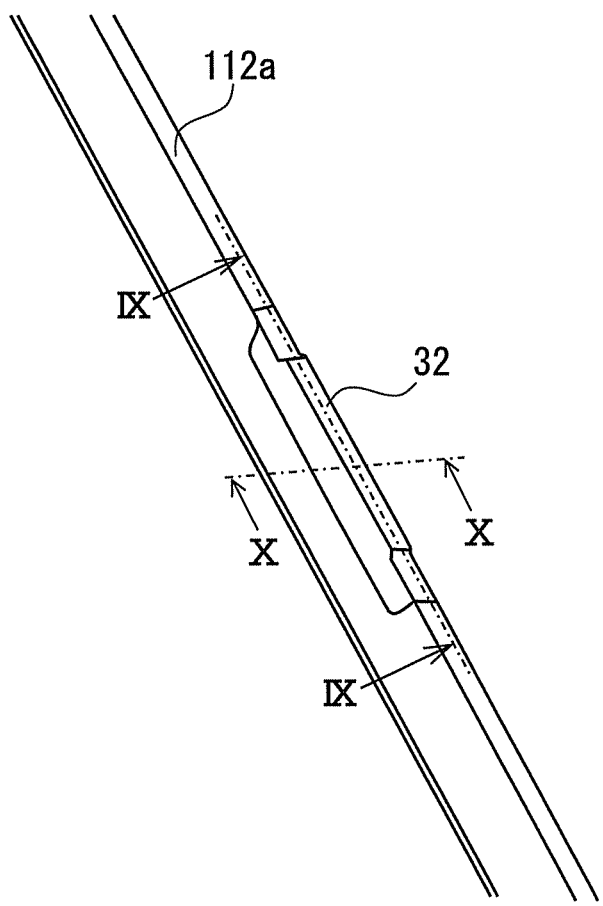
FIG. 8 is an enlarged view of a protruded portion according to Embodiment 2.
Figure 9:
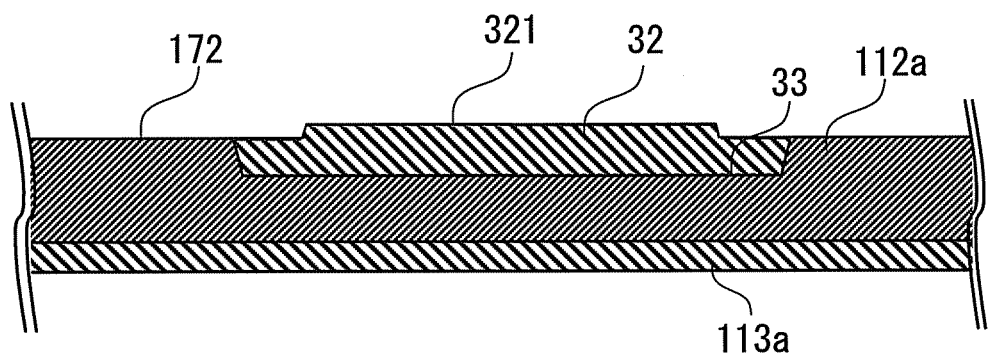
FIG. 9 is a cross-sectional view of the protruded portion according to Embodiment 2.
Figure 10:
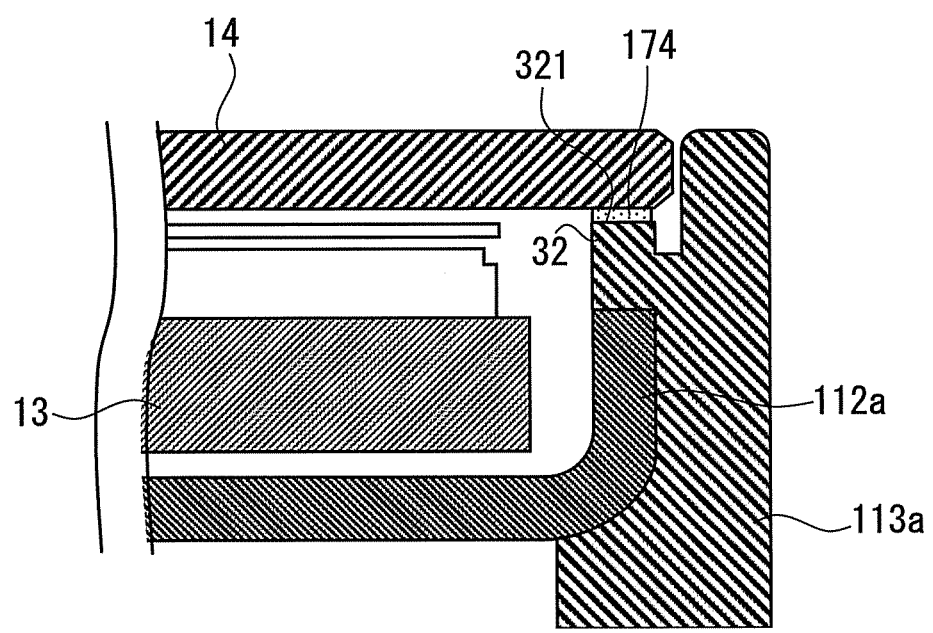
FIG. 10 is a cross-sectional view of the protruded portion according to Embodiment 2.

The configuration in detail of the protrusion 32 will be described with reference to FIG. 8 to FIG. 10. FIG. 8 is an enlarged perspective view of the protrusion 32. FIG. 8 shows the protrusion 32 of an area in a broken line circle in FIG. 7. FIG. 9 is a cross-sectional view along IX-IX of FIG. 8. FIG. 10 is a cross-sectional view along X-X of FIG. 8. FIG. 10 also shows parts such as the liquid crystal unit 13, display panel 14, and resin wall part 113a, in addition to the housing 31.

The protrusion 32 is made of a resin material. As shown in FIG. 9, the side wall 112a has a recess 33 recessed in the thickness direction of the housing 31. The protrusion 32 is fitted in this recess 33. The height of the top face 321 of the protrusion 32 in the thickness direction of the housing 31 is higher than the end face 172 of the side wall 112a facing the display panel 14. In other words, the protrusion 32 projects toward the display panel 14 more than the end face 172 of the side wall 112a, Below the side wall 112a is present a lower portion of the resin wall part 113a.

As shown in FIG. 10, the top face 321 of the protrusion 32 is bonded to the display panel 14 with an adhesive 174. Similarly to Embodiment 1, the end face 172 of the side wall 112a is also bonded to the display panel 14 with the adhesive 171 (see FIG. 3). Since the protrusion 32 projects toward the display panel 14 more than the end face 172 of the side wall 112a as described above, when the display panel 14 is mounted, the display panel 14 abuts on the protrusions 32 via the adhesive 174. Therefore, the adhesive 174 between the protrusions 32 and the display panel 14 is compressed. Accordingly, the thickness of the adhesive 171 between the side wall 112a and the display panel 14 is larger than the thickness of the adhesive 174 between the protrusions 32 and the display panel 14 in the thickness direction of the housing 31 (see FIG. 3 and FIG. 10). The adhesive 174 may be applied also between the protrusions 32 and the display panel 14 to improve the waterproofness.

As described above, in the configuration of the mobile terminal device 2 according to this embodiment, the housing 31 includes protrusions 32 on the side walls 112a and 112b, The protrusions 32 project toward the display panel 14 more than the side walls 112a and 112b, Therefore, the display panel 14 abuts on the protrusions 32 via the adhesive 174. When the display panel 14 is subjected to an external force such as when the mobile terminal device 2 is dropped, the loads (impact) act on the portions where the display panel 14 abuts on the protrusions 32. Since the protrusions 32 are made of a resin material that is less rigid than sheet metal, the loads (impact) applied to the display panel 14 when it is dropped, for example, can be alleviated. As a result, damage or breakage of the display panel 14 can be avoided. The main component of the protrusions 32 is not limited to resin materials and may be any other materials that have lower rigidity than sheet metal.

Arranging the protrusions 32 at portions where the display panel 14 is susceptible to loads (impact) can effectively alleviate the loads on the display panel 14. Portions susceptible to loads are, for example, central portions in the longitudinal direction of the side walls 112a and 112b, and four corners of the display panel 14. In the case with a fold type mobile terminal device, portions where the display panel 14 contact or fit with the other housing when the device is closed (folded) are susceptible to loads.

The thickness of the adhesive between the side walls 112a and 112b and the display panel 14 is larger than the thickness of the adhesive between the protrusions 32 and the display panel 14. Therefore, the adhesive acts as a shock absorber and can alleviate the impact applied from the side walls 112a and 112b on the display panel 14.

If the housing 31 does not have the protrusions 32, when the display panel 14 is placed on the adhesive after the application thereof, the adhesive may be compressed due to the weight of the display panel 14, if it is not fully set. If the adhesive is compressed, the display panel 14 will sink and cannot be placed at a prescribed position. Increasing the amount of the adhesive in anticipation of subsidence of the display panel 14, if done excessively, will result in the display panel 14 set higher than the prescribed position.

With the configuration of the mobile terminal device 2, however, as the display panel 14 abuts on the protrusions 32 via the adhesive, the display panel 14 can be positioned precisely in the thickness direction of the housing 31.

<Embodiment 3>

Figure 11:
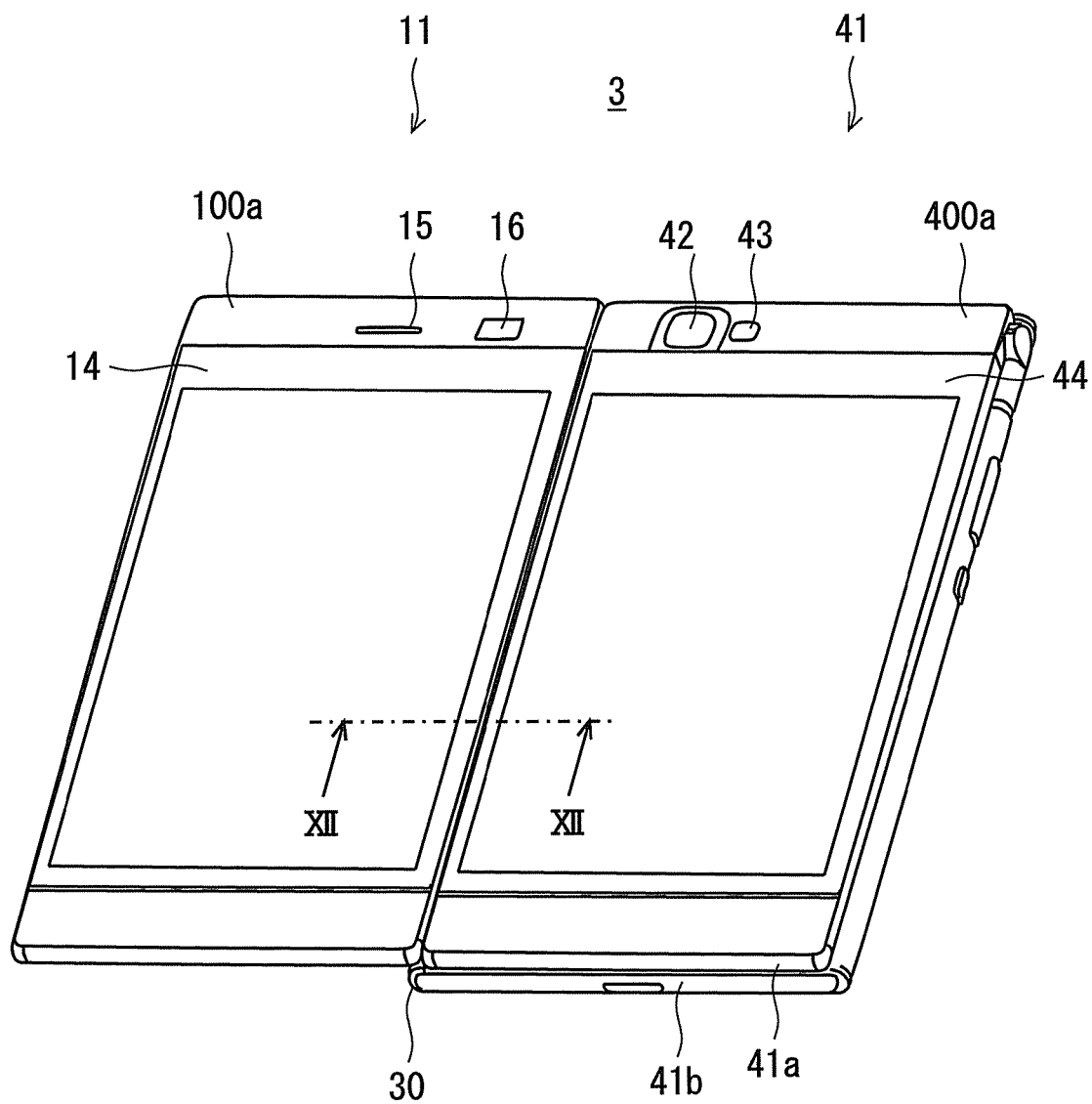
FIG. 11 is an external perspective view of a mobile terminal device according to Embodiment 3.

Next, Embodiment 3 of the present invention will be described. An external perspective view of a mobile terminal device 3 according to this embodiment is shown in FIG. 11. The mobile terminal device 3 includes a first housing 11, a second housing 41, and a hinge 30.

<General Configuration of Mobile Terminal Device 3>

The first housing 11 corresponds to the mobile terminal device 1 according to the previously described Embodiment 1. Namely, the first housing 11 includes the display panel 14. The display panel 14 is bonded to end portions of the side walls of the first housing 11. The first housing 11 differs from the previously described mobile terminal device 1 in that it does not include a board and a battery.

The second housing 41 includes an upper housing 41a and a lower housing 41b, The upper housing 41a is configured similarly to the first housing 11. Namely, the upper housing 41a includes the display panel 44 on its main surface 400a, The upper housing 41a includes side walls made of sheet metal. End portions of the side walls are bonded to the display panel 44. The upper housing 41a further includes a camera 42 and a flash 43.

The second housing body 41 includes the lower housing 41b on the opposite side from the display panel 44 of the upper housing 41a, The lower housing 41b is integrally formed with the upper housing 41a and accommodates a board and a battery (not shown).

The hinge 30 (connecting part) connects the first housing 11 and the second housing 41 such as to allow them to open and close. FIG. 11 shows an open state of the mobile terminal device 3. The hinge 30 connects the first housing 11 and the upper housing 41a such as to allow them to open and close around a rotation axis. In other words, the hinge 30 connects the first housing 11 and the upper housing 41a such that the mobile terminal device 3 can transform from a closed state (first state) to an open state (second state), or, from an open state (second state) to a closed state (first state). The hinge 30 connects the first housing 11 and the upper housing 41a such that the display panel 14 and the display panel 44 each face outside in the closed state. In other words, the hinge 30 connects the first housing 11 and the upper housing 41a such that the display panel 14 and the display panel 44 are oriented in opposite directions. The display panel 14 and the display panel 44 are arranged to form a generally coplanar surface in the open state shown in FIG. 11. The hinge 30 holds the first housing 11 and the upper housing 41a in the closed state, and holds the first housing 11 and the upper housing 41a in the open state.

<Detailed Structure of Connecting Part>

Figure 12:
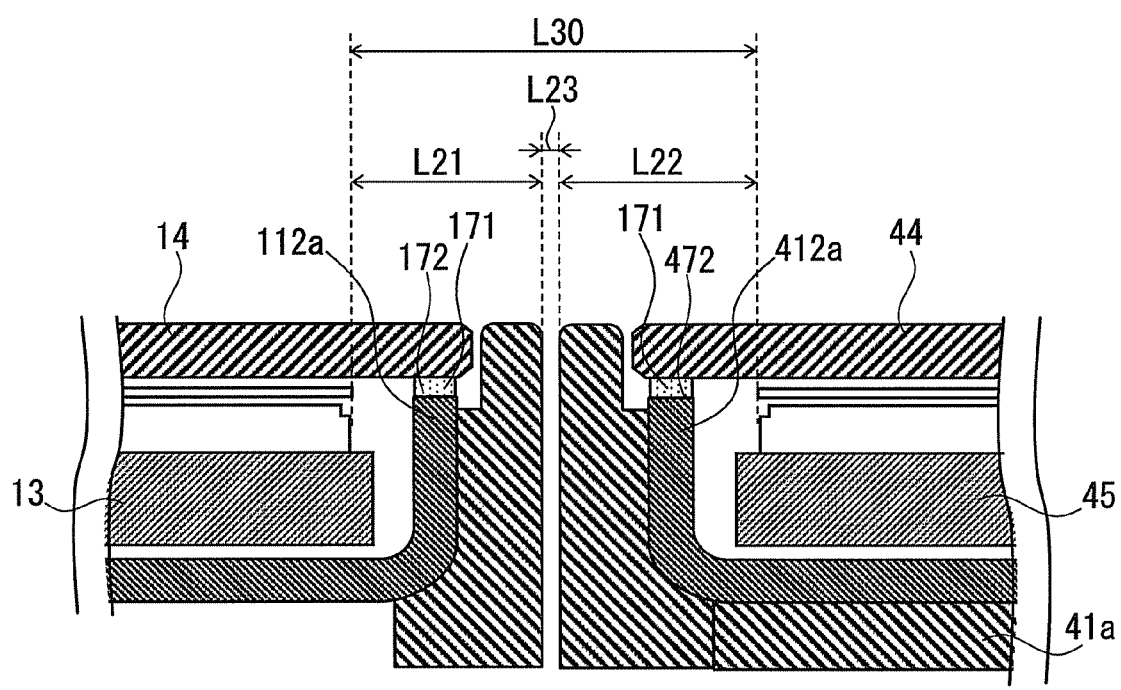
FIG. 12 is a cross-sectional view of the mobile terminal device according to Embodiment 3 in an open state.

Next, the detailed structure of the connecting part between the first housing 11 and second housing 41 will be described. FIG. 12 is a cross-sectional view along XII-XII of FIG. 11. The configuration of the first housing 11 is the same as that shown in FIG. 3 and will not be described. The structure of the upper housing 41a is also the same as that of the first housing 11. Namely, the upper housing 41a accommodates the liquid crystal unit 45 and display panel 44. The display panel 44 is bonded to the top face 472 of the side wall 412a adjacent the first housing 11 with the adhesive 171.

As described above, the mobile terminal device 3 can have a narrower frame width by bonding the display panel 14 to the end portion of the side wall 112a, Similarly, since the display panel 44 is bonded to the end portion of the side wall 412a of the upper housing 41a, too, the upper housing 41a of the mobile terminal device 3 can have a narrower frame width. Therefore, the opposing frames of the respective housings are narrow.

Now an explanation will be made as to the distance between the end of the active area of the display panel 14 and the end of the active area of the display panel 44 (hereinafter referred to as "inter-screen distance"). Distance L30 in FIG. 12 is the inter-screen distance. Distance L30 is the sum of distances L21, L22, and L23. The distance L21 is the distance from the end of the active area of the first housing 11 to the side face of the first housing 11. The distance L22 is the distance from the end of the active area of the second housing 41 to the side face of the upper housing 41a, The distance L23 is the width of the clearance between the first housing 11 and the upper housing 41a, Since the end portions of the side walls (sheet metal) are bonded to the display panels in respective housings, the frame width can be made narrow as described in connection with Embodiment 1. As a result, the mobile terminal device 3 can have a smaller distance L30, i.e., the inter-screen distance can be made shorter.

In the cross-sectional view of FIG. 12, the hinge is not illustrated, so that the first housing 11 and upper housing 41a appear to be not connected to each other. However, in a cross section of other parts in the longitudinal direction of the first housing 11 and upper housing 41a, the first housing 11 and upper housing 41a are connected to each other with the hinge.

As described above, the mobile terminal device 3 according to this embodiment includes the first housing 11 and second housing 41. The end portion of the side wall 112a (sheet metal) of the first housing 11 adjacent the second housing 41 is bonded to the display panel 14. Similarly, the end portion of the side wall 412a (sheet metal) of the second housing 41 adjacent the first housing 11 is bonded to the display panel 44. Therefore, the mobile terminal device 3 can have a smaller width of the frames of respective display units. The inter-screen distance is accordingly shorter. As a result, the user can view a moving image (or still image) displayed on both display units of the first housing 11 and second housing 41 as one big screen naturally.

In this embodiment, the hinge 30 connects the first housing 11 and the second housing 41 such as to allow them to open and close. Therefore, the mobile terminal device 3 offers compactness as it closes when carried around, while realizing a large screen with two display units when moving images or the like are viewed.

While the present invention has been described in connection with the embodiments above, it is to be understood that the present invention is not limited to the configurations of the embodiments described above, but includes various changes, modifications, and combinations that a person skilled in the art can make within the scope of the invention defined by the claims of the present application.

This application claims priority to Japanese Patent Application No. 2012-253433 filed on Nov. 19, 2012, the entire contents of which are incorporated by reference herein.

REFERENCE SIGNS LIST 1 to 3 Mobile terminal device
11, 31, 41 Housing
13, 45 Liquid crystal unit
14, 44 Display panel
15 Receiver
16 Proximity sensor
30 Hinge
32 Protruded portion
42 Camera
43 Flash
111 Housing body
112a to 112d, 412a Side wall
113a, 113b Resin wall part
114a, 114b Antenna area
121 Board
122 Battery
141 Active area
171, 174 Adhesive

What is claimed is:

1. A mobile terminal device comprising:
    a housing comprising a housing body and side walls provided around the housing body; and
    a display panel provided on the side walls, wherein
    at least one of the side walls is made of sheet metal and stands from the housing body toward the display panel,
    an end face of the sheet metal that faces the display panel is bonded to a surface of the display panel that faces the housing body, the end face being a terminal end of the sheet metal, and
    the housing includes a component having a lower rigidity than the sheet metal at the end portion of the sheet metal that faces the display panel, the component having a top face higher than that of a surface bonding between the sheet metal and the display panel in a thickness direction of the housing.

2. The mobile terminal device according to claim 1, wherein the display panel is bonded to the top face of the component.

3. The mobile terminal device according to claim 1, wherein the component is provided in a central portion in a longitudinal direction of the side walls.

4. The mobile terminal device according to claim 1, wherein in the side walls, the component is provided at positions corresponding to four corners of the display panel.

5. The mobile terminal device according to claim 1, wherein the component is mainly made of a resin material.

6. A mobile terminal device comprising:
   at least two mobile terminal devices according to claim 1; and
   a connecting part that connects an end part at the side wall of one of the mobile terminal devices and an end part at the side wall of the other one of the mobile terminal devices.

7. The mobile terminal device according to claim 6, wherein the connecting part connects the one and the other one of the mobile terminal devices around a rotation axis such that the display panels of both of the mobile terminal devices face outside at least in a first state.

\* \* \* \* \*